United States Patent [19]

Nakayama et al.

[11] Patent Number: 4,810,524

[45] Date of Patent: Mar. 7, 1989

[54] INORGANIC POWDERS WITH IMPROVED DISPERSIBILITY

[75] Inventors: Masatoshi Nakayama; Haruyuki Morita, both of Saku; Yuichi Kubota, Komoro, all of Japan

[73] Assignee: TDK Corporation, Tokyo, Japan

[21] Appl. No.: 936,992

[22] Filed: Dec. 2, 1986

Related U.S. Application Data

[63] Continuation of Ser. No. 504,774, Jun. 16, 1983, abandoned.

[30] Foreign Application Priority Data

Jun. 18, 1982 [JP] Japan .................. 57-103928

[51] Int. Cl.⁴ .................................... B05D 3/06
[52] U.S. Cl. ........................... 427/38; 427/41; 204/169; 204/170; 204/171; 428/570
[58] Field of Search .............. 428/570; 427/38, 41; 204/169–171

[56] References Cited

U.S. PATENT DOCUMENTS

| | | | |
|---|---|---|---|
| 3,252,842 | 5/1966 | Williams | 149/6 |
| 3,725,521 | 4/1973 | Ebling | 419/35 |
| 3,892,610 | 7/1975 | Huzinec | 149/19.92 |
| 3,935,340 | 1/1976 | Yamaguchi et al. | 427/216 |
| 4,197,347 | 4/1980 | Ogawa et al. | 428/900 |
| 4,202,689 | 5/1980 | Ohno et al. | 419/35 |
| 4,260,466 | 4/1981 | Shirahata et al. | 427/35 |
| 4,268,568 | 5/1981 | Sard et al. | 428/336 |
| 4,333,961 | 6/1982 | Bruce et al. | 427/13 |
| 4,373,004 | 2/1983 | Asano et al. | 346/76 L |
| 4,419,382 | 12/1983 | Sliemers et al. | 427/40 |
| 4,419,404 | 12/1983 | Arai et al. | 428/336 |
| 4,422,915 | 12/1983 | Wielonski et al. | 204/165 |
| 4,429,024 | 1/1984 | Ueno et al. | 427/131 |
| 4,490,505 | 12/1984 | Pendergrass | 427/128 |
| 4,495,242 | 1/1985 | Arai et al. | 428/900 |
| 4,521,482 | 6/1985 | Arai et al. | 428/900 |
| 4,619,861 | 10/1986 | Nakayama et al. | 428/220 |

FOREIGN PATENT DOCUMENTS 49-40791  11/1974  Japan .................. 427/41

OTHER PUBLICATIONS

Letts et al, *J. Vac. Sci. Technol.*, 19(#3), 739-42 (Sep.-Oct., 1981).

Primary Examiner—Edward A. Miller
Attorney, Agent, or Firm—Seidel, Gonda, Lavorgna & Monaco

[57] ABSTRACT

Inorganic powders are coated with a thin film of an organic polymer formed on the individual particles by plasma polymerization. The film thickness may be not more than 100 Å, and the inorganic powders include magnetic ones.

8 Claims, 2 Drawing Sheets

F I G. 1
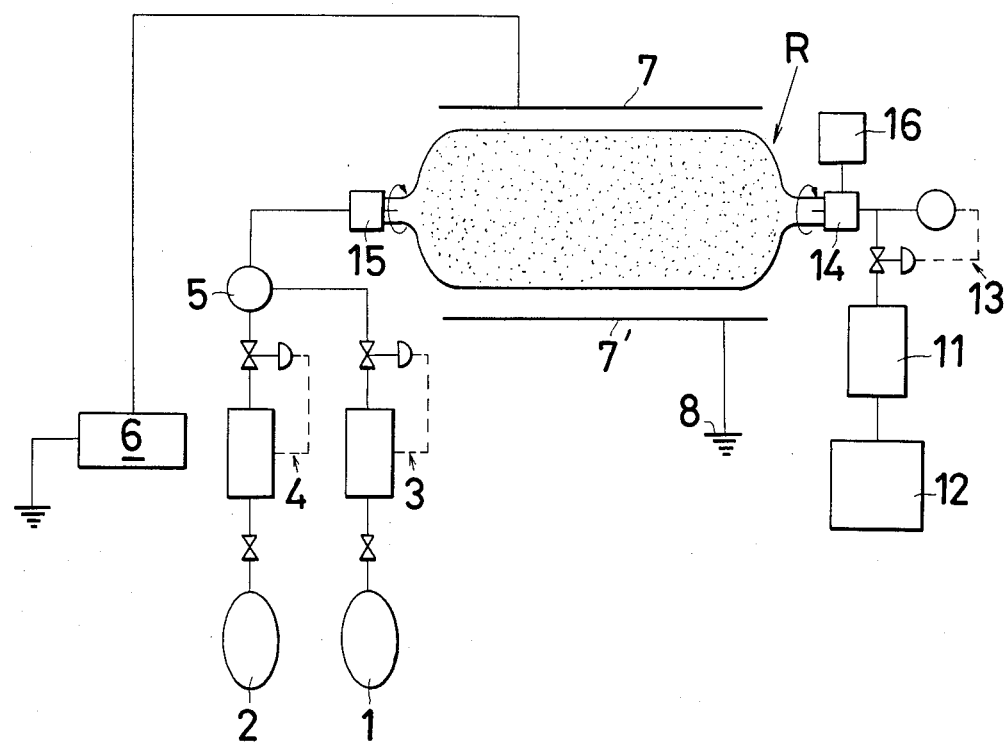

F I G. 2
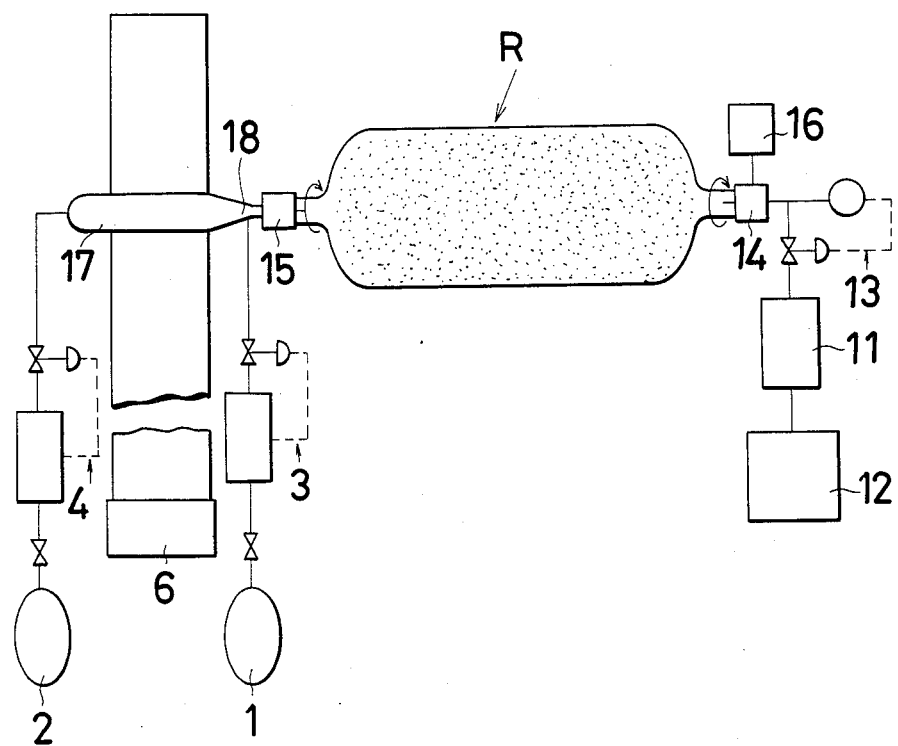

INORGANIC POWDERS WITH IMPROVED DISPERSIBILITY

This is a continuation of co-pending application Ser. No. 504,774, filed on June 16, 1983, now abandoned.

BACKGROUND OF THE INVENTION

This invention relates to an inorganic powder the individual particles of which are coated with a thin film of a polymer synthesized by plasma polymerization to improve the dispersibility of the powder which is scarcely dispersible in organic binders.

Industrial processes include operations which require dispersion of varied inorganic powders in organic binders. Inorganic powders, e.g., varied ceramic, ferrite, iron oxide, Co-doped iron oxide, and metal powders, are used for electronical functional devices, heat insulators, rubbers, magnets, magnetic tapes and discs, electrodes, and in many other applications. In an intermediate stage of the processes each inorganic powder must be dispersed in a polymeric material containing an organic solvent, i.e., in an organic binder. The quality of the end product is improved if the powder is dispersed thoroughly and uniformly. Inorganic powders are also added supplementarily, as reinforcing agent, filler, conductive additive or for other diversified purposes, to slurries containing organic binders as main ingredients. In these applications, too, the more uniformly the inorganic particles are dispersed the better the result.

Actually, however, thorough dispersion of inorganic powders in organic binders often involve great difficulties. This is because the inorganic substances are scarcely affinitive for the organic substances in which they are to be dispersed. Finer particles enhance the difficulty of uniform dispersion.

For the improvement of dispersibility it has been in practice to add a dispersant, such as a fatty acid ester, to the binder. However, the addition of a dispersant is not fully effective and, moreover, the dispersant can ooze out of the molded product to a disadvantage. Mechanical dispersion by a pearl mill, three-roll mill, ball mill, sand grinder mill or the like is also in use. Even this fails sometimes to ensure adequate dispersion. A serious shortcoming is that a prolonged treatment for mechanical dispersion on such a mill can break the minute shape of the inorganic particles. This possibility poses a major problem to the applications where the acicularity or other specific shape of the particles is an important consideration.

Under the circumstances, there has been wide-spread need for methods of satisfactorily improving the uniform dispersibility of inorganic powders in organic binders without any adverse effect upon the fine structure of the particles. In attempts to meet the requirements the following methods have hitherto been proposed:

(1) Coating inorganic particles with a dispersant.

(2) Coating inorganic particles with a high molecular compound, in the following ways:
  (a) Coating with an aqueous high molecular compound.
  (b) Coating with an organic solvent type high molecular compound.
  (c) Coating by radiation polymerization.
  (d) Coating by ultraviolet polymerization.
  (e) Coating by any of mechanochemical techniques.

When inorganic particles are coated with a dispersant in accordance with the method (1), most of the dispersant simply sticks to the particle surface instead of being adsorbed on the latter in an effective way. Washing the dispersant off the surface would remove the smaller adsorbed portion too. If the particles are dispersed in the binder with the dispersant merely sticking to their surface, the proportional ratio of the dispersant to the binder will be so large that its unfavorable effects upon the quality of the end product will become evident. Furthermore, the operation will lack stability and continuity. For these reasons the method (1) is not desirable. For the coating with a high molecular compound (the method (2)), different approaches (a) to (e) have been proposed. However, none of them have, after all, succeeded in effecting uniform coating without uniformly dispersing the particles in the polymer solution. Ordinarily, such treatments are required because of the poor dispersibility of the particles in organic binders, and nevertheless the treatments themselves have to depend on good dispersibility of the particles for their success. This is, in a sense, a self-contradiction, and therefore the second method including their modifications are unacceptable. Another factor that hinders the commercial acceptance is that in those dispersion systems the inorganic powders and high molecular compounds tend to aggregate together for objectionable size enlargement, imparting undesirable effects upon the dispersion of the particles.

The polymeric coating films for the purpose of improving the powder dispersibility should be evenly and thinly formed on the particles. From this viewpoint none of the abovementioned methods of the prior art are satisfactory.

For the reasons stated, the development of a novel polymeric coating method to replace the foregoing has been called for. After our intensive studies about the method for polymeric coating of inorganic particles with a uniform and thin film in a stabilized operation, it has now been found that plasma polymerization best meets the end. The present invention is based upon this discovery.

BRIEF DESCRIPTION OF THE DRAWINGS

FIG. 1 is a schematic diagram of an apparatus for powder coating by high-frequency plasma polymerization in accordance with the invention; and FIG. 2 is a diagram similar to FIG. 1 but showing an apparatus for microwave plasma polymerization according to the invention.

DETAILED DESCRIPTION

The process of plasma polymerization consists of mixing a discharged plasma of a carrier gas, e.g., Ar, He, $H_2$, or $N_2$, with a plasma-polymerizable organic gas, and bringing the mixed gas into contact with inorganic particles to form a plasma-polymerized film thereon.

To be more exact, in principle, an electric field is applied to the gas kept at a low pressure, and the free electrons present in a small proportion in the gas are subjected to an electric field acceleration because of the much larger intermolecular distance than under ordinary pressure, and they acquire a kinetic energy (electron temperature) of 5 to 10 eV. As the atoms at this velocity collide with other atoms or molecules, they break the atomic or molecular orbitals and dissociate them into normally instable chemical species, such as electrons, ions, and neutral radicals. The dissociated electrons are again subjected to the field acceleration to dissociate, in turn, other atoms and molecules. This chain action quickly changes the gas to a highly ionized state, or to the form known as a plasma gas. With few chances of collision with electrons, the gas molecules absorb little energy and are kept at a temperature close to the ordinary level. The system in which the kinetic energy of electrons (electron temperature) and the thermal motion of the molecules (gas temperature) have been separated is called a low temperature plasma, where the chemical species comparatively retain their original forms and are in conditions ready for an additive chemical reaction such as polymerization. The present invention takes advantage of the above conditions is forming a plasma-polymerized film over particles. Because the low temperature plasma is utilized, there is no unfavorable thermal effect upon the powder.

The grounds on which plasma polymerization is deemed best suited for the polymeric coating of inorganic particles may be itemized as follows:

(1) The plasma polymerization, which uses a gaseous system, produces a greater permeative force than with a liquid system.

(2) The process can give a uniform, thin film on the surface of every shape, plane or spherical, regular or irregular.

(3) Because the concentrations of active species (cation, anion, and radical species) per unit volume of the material for the plasma polymerization are by far the higher than in ordinary polymerization, an adequately uniform film is formed on particles of a large specific surface area, especially on fine particles.

(4) Its film forming process being a dry process, the plasma polymerization requires no solvent but permits a direct treatment. Thus, the steps of choosing, replacing, and dispersing the solvent can be eliminated.

(5) The plasma-polymerized film is uniform with a thickness in the range of 0.1 to 10,000 Å whereas uniform films thinner than 100 Å cannot be formed conventionally.

(6) The process does not impair the physical properties and morphological features or inorganic particles.

The monomer gas to form a plasma-polymerized film may be any of ordinary organic gases of organic compounds (e.g., C—H, C—H—O, carbon-halogen, carbon-oxygen-halogen, and carbon-hydrogen-halogen systems) including plasma-polymerizable hydrocarbons, such as ethylene, propylene, acetylene, styrene, methyl methacrylate, vinyl acetate, tetrafluoroethylene, methane, ethane, and propane. In any case, the monomer gas should be the same as, or of the same type as, or affinitive for, the organic binder in which the particular inorganic particles are to be dispersed.

The thickness of the film to be formed depends on the intended use of the end product, but usually a thickness of less than 100 Å proves adequately effective, with a minimum of adverse effect of the film deposition upon the product.

Referring now to FIGS. 1 and 2, there are shown two types of plasma polymerizers for coating inorganic particles with a plasma-polymerized film. FIG. 1 shows a plasma polymerizer which depends on high-frequency discharge and FIG. 2, a plasma polymerizer that uses microwave discharge.

In FIG. 1 the symbol R designates a rotary polymerization reaction vessel made of glass, quartz or the like. The horizontal vessel is provided on its openings at opposite ends with rotary joints 14, 15, and it can be driven at a predetermined rotating velocity by a motor 16. The rotary joints are detachable and, after removing them, an inorganic powder is introduced into the reaction vessel R. A monomer gas and a carrier gas from their respective sources 1, 2 are supplied via mass flow controllers 3, 4 and through a mixer 5 to the reaction vessel at the rotary joint 15. The supply pipings are connected to the joint 15 with magnetic fluid seals. The monomer gas is chosen, as explained above, to be a plasma-polymerizable organic gas affinitive for the particular organic binder to be employed. The carrier gas is suitably chosen from among Ar, He, $H_2$, $N_2$, etc. A pair of electrodes 7, 7' are disposed in parallel, along the reaction vessel R in between. One electrode 7 is connected to a high-frequency power source 6 and the other electrode 7' is grounded at 8. The vessel R is equipped with a vacuum system for its evacuation, which comprises a liquid nitrogen trap 11, a rotary oil-seal pump 12, and a vacuum controller 13. This vacuum system is connected through a magnetic fluid seal to the rotary joint 14.

In operation, the rotary joints are detached from the reaction vessel 5 and an inorganic powder to be treated is fed. The vessel is then slowly evacuated by the rotary oil-seal pump 12 to a vacuum degree of $10^{-2}$ Torr or more. Following this, the monomer and carrier gases are supplied as mixed at a predetermined flow rate into the vessel. The degree of vacuum inside the reactor is maintained within the range of 0.01 to 10 Torr by the vacuum controller 13. After the operations of the supply and vacuum systems have become steady, the reaction vessel is caused to rotate, e.g., at 20 to 70 rpm, and then electric power at a high frequency from the source 6 is applied. The feed rates of the monomer and carrier gases are predetermined according to the amount of the powder charged into the vessel and the desired film thickness to be attained, and the point of time at which the plasma color characteristic of the monomer disappears due to the consumption of the monomer is fixed at the end point of the reaction. As the reaction vessel turns, the mixed plasma gas spreads through the particles dispersed and suspended inside the vessel to form a highly adhesive plasma-polymerized film on the individual particles.

FIG. 2 illustrates a microwave-discharge plasma polymerizer, with the parts like those in FIG. 1 given like symbol or numbers. Here the reaction vessel R is formed with a plasma chamber 17 as a horizontal extension from one side of the vessel, e.g., beyond the rotary joint 15, to be supplied at the outer end with the carrier gas from the source 2. The carrier gas fed to the chamber 17 is ionized to a plasma by the oscillation of a magnetron 6 and is stabilized as such. The monomer gas is introduced into the plasma chamber at a constriction 18 formed at the other end. The rest of elements are all the same as those shown in FIG. 1.

For the plasma source, DC, AC or other discharge may be utilized as well as the high-frequency or microwave discharge so far described. In the DC and AC discharge, the plasma polymerization can be carried out by the interior-electrode procedure.

EXAMPLE 1

Using the apparatus of FIG. 1, ethylene was plasma-polymerized to deposit a film on magnetic particles of $\gamma$—$Fe_2O_3$. The conditions for the plasma polymerization were as follows:

| Monomer gas | Ethylene gas |
| --- | --- |
| Monomer gas flow rate | 1 ml/min |
| Carrier gas | Argon |
| Carrier gas flow rate | 5 ml/min |
| Degree of vacuum | 0.5 Torr |
| Quantity of $\gamma$-$Fe_2O_3$ fed | 50 g |
| Reaction vessel rotating velocity | 50 rpm |
| High-frequency power supply | 13.56 MHz 50 W |

The monomer and carrier gases were supplied for 10 minutes and the point of time at which the monomer in the vessel was totally consumed and the plasma color characteristic of the monomer disappeared was regarded as the end point of the reaction. The results of the $\gamma$—$Fe_2O_3$ analyses with a CHN coder were as tabulated below:

| | C % | % | N % |
| --- | --- | --- | --- |
| Untreated $\gamma$-$Fe_2O_3$ | 0.10 | 0.05 | 0.00 |
| Polymer-coated " | 0.30 | 0.07 | 0.00 |

Thus, a polymer containing C and H deposited on the particles, and electron-microscopic examination and the depth analysis by ESCA (Electron Spectroscopy for Chemical Analysis) revealed that a uniform 25 Å-thick film had deposited on the individual particles.

EXAMPLE 2

Using the apparatus of FIG. 2, ethylene was polymerized by microwave-discharge plasma polymerization to form a film on 50 grams of particles of alumina as an example of ceramics. The conditions employed were the same as those in Example 1, with the exception that a power of 100W with a microwave at a frequency of 2450 MHz under the oscillation by the magnetron was applied and, after the stabilization of the resulting plasma, ethylene gas was fed at a rate of 1 ml/min.

Analytical results with a CHN coder were as follows:

| | C % | H % | N % |
| --- | --- | --- | --- |
| Untreated ceramic | 0.05 | 0.05 | 0.00 |
| Polymer-coated " | 0.35 | 0.08 | 0.00 |

Uniform polymer film deposition comparable to that in Example 1 was observed. The film thickness was 30 Å

Dispersibility tests

In order to evaluate the improvements achieved in the dispersibility of the plasma-polymerized particles obtained in Examples 1 and 2, the degrees of wetting heat the test particles developed with five different solvents were determined. The higher the heat of wetting the greater the affinity of the particles for the solvent and this is a measure of improvement in dispersibility of the given particles.

The following table shows the results:

| | Heat of wetting (cal/g) | | | |
| --- | --- | --- | --- | --- |
| Solvent | Untreated $\gamma$-$Fe_2O_3$ | Example 1 | Untreated ceramic | Example 2 |
| Methyl ethyl Ketone | 3.0 | 5.6 | 2.3 | 2.9 |
| Toluene | 2.5 | 4.9 | 1.9 | 2.5 |
| Benzene | 2.2 | 3.7 | 1.5 | 1.7 |
| Acetone | 4.0 | 6.8 | 2.5 | 3.5 |
| Ethanol | 5.0 | 8.1 | 3.0 | 4.0 |

EXAMPLE 3

The procedure of Example 1 was repeated under the same conditions excepting that ethylene as the monomer was replaced by acetylene. The film formed was 90 Å in thickness.

EXAMPLE 4

The procedure of Example 1 was repeated excepting that styrene was used instead as the monomer. The film thickness was 60 Å.

EXAMPLE 5

The polymerization under the same conditions as in Example 1 excepting the use of methane as the monomer yielded a film 20 Å thick.

EXAMPLE 6

The procedure of Example 1 was followed with the exception that the monomer and carrier gases were supplied for one hour. The film formed was 100 Å thick.

EXAMPLE 7

In the procedure of Example 1 the monomer and carrier gases were supplied for a further extended period of five hours. The film was 480 Å thick.

EXAMPLE 8

In the procedure of Example 1 the monomer and carrier gases were supplied for only one minute. The film thickness (estimated) was 2 Å.

The degrees of wetting heat the coated particles of Examples 3 to 8 developed upon immersion in methyl ethyl ketone were determined. The following table gives the values:

| Example | Heat of wetting (cal/g) |
| --- | --- |
| 3 | 5.0 |
| 4 | 5.1 |
| 5 | 4.2 |
| 6 | 5.5 |
| 7 | 5.7 |
| 8 | 5.2 |

Because of perfect coating, the plasma-polymerized film, even less than 100 Å thick, can satisfactorily improve the dispersibility of the particles.

As described hereinbefore, the present invention successfully deposits a thin, uniform film of an organic polymer by the unique technique of plasma polymerization on the particles, especially fine particles, of an inorganic substance, such as a ceramic, magnetic, graphite or other similar powders. The invention remarkably improves the dispersibility of those inorganic powders in organic binders, thus significantly contributing to the qualitative improvement and stability of the end products, such as various ceramic-electronic moldings, magnets, electrodes, and magnetic recording media.

What is claimed is:

1. A method for improving the dispersibility of individual particles of an inorganic powder in an organic solution of a polymer binder, comprises the steps of:

fluidizing the inorganic powder in a polymerization reaction vessel, said vessel being cylindrical and rotated about a principal cylindrical axis of said vessel so as to fluidize the inorganic powder, said axis being horizontally disposed;

introducing a plasma-polymerizable monomer gas into the vessel;

applying a plasma-forming energy to the monomer gas to form a plasma around each said individual particle of the fluidized inorganic powder; and coating, thereby, a thin plasma-polymerized film of said gas about each said fluidized individual particle.

2. A method for improving the dispersibility of individual particles of an inorganic powder in an organic solution of a polymer binder, comprises the steps of:

fluidizing the inorganic powder in a polymerization reaction vessel;

introducing a plasma-polymerizable monomer gas into the vessel;

applying a plasma-forming energy to the monomer gas to form a plasma around each said individual particle of the fluidized inorganic powder;

coating, thereby, a thin plasma-polymerized film of said gas about each said fluidized individual particle; and subsequently dispersing the coated particles in the organic solution of the polymer binder.

3. The method in accordance with claims 1 or 2 further comprising mixing a gas selected from the group consisting of Ar, Me, $H_2$, and $N_2$ with the monomer gas prior to introducing said monomer gas into the vessel.

4. The method in accordance with claims 1 or 2 further comprising maintaining a vessel pressure in a range of about 0.01 to about 10 Torr when said plasma is formed.

5. The method in accordance with claims 1 or 2 further comprising suplying said plasma-forming energy by electrical power from a high frequency electrical power source.

6. The method in accordance with claims 1 or 2 wherein said inorganic powder is selected from the group consisting of ceramic and magnetically susceptible graphite materials.

7. The method in accordance with claim 6 wherein said inorganic powder is alumina.

8. The method in accordance with claims 1 or 2 wherein said plasma-polymerizable monomer gas is selected from the group consisting of ethylene, propylene, acetylene, styrene, methyl methacrylate, vinyl acetate, tetrafluoro-ethylene, methane, ethane, and propane.

* * * * *